United States Patent Office 3,431,130
Patented Mar. 4, 1969

3,431,130
PROCESS OF PREPARING FINE PARTICLE PIGMENTS
Gino A. Ratti, Jr., Holland, Mich., assignor, by mesne assignments, to Chemetron Corporation, Chicago, Ill., a corporation of Delaware
No Drawing. Filed Aug. 8, 1966, Ser. No. 570,709
U.S. Cl. 106—309                    10 Claims
Int. Cl. C09b 67/00

ABSTRACT OF THE DISCLOSURE

Dry pigments of or having fine particle size and dispersibility are produced without agglomeration or aggregation by dehydrating a pigmentary presscake with a low boiling organic solvent and combining with mixing a solid salt dispersing agent which is thermally stable under the conditions of mixing but is volatilizable when heated to temperatures below that at which the pigment decomposes. The dispersing agent and the solvent are removed from the pigment by heating to volatilization.

---

This invention relates to an improved method for preparing solid particles having fine particle size and dispersibility. More particularly, this invention relates to a process for producing pigments with improved dispersing properties by mixing pigmentary particles in the form of a presscake with a dispersing agent which can be removed by volatilization without thermal damage to the pigment or aqueous extraction of the dispersing agent.

One of the major problems encountered in dispersing pigments in plastics, paint vehicles or printing inks is the breaking down of the so-called agglomerates or aggregates which are relatively large clumps of pigment particles held together by forces variously described as interstitial deposits left by the evaporation of wash liquors, configurational agglomeration effected by compressing forces during sintering in some high temperature methods, etc. All of these aggregates can be eliminated by the process known as flushing, whereby the pigment originally wet with water has the water displaced by a hydrophobic liquid so that the pigment is then wet only by the non-aqueous liquid. Thus, it appears that the presence of water is primarily responsible for the formation of aggregates. If a flushing could be "dried," that is, the solvent removed, a pigment would be left containing no aggregates. However, the non-aqueous liquids used in flushings are for the most part resins, varnishes or high boiling oils which do not lend themselves to easy solvent removal. Even if solvent removal could be effected there still would remain the problem of reaggregation during the drying step.

There are several ways of avoiding aggregates. Some of these are: preparing lakes using such diluents as York Whiting, adding surfactants, adding lubricants of various types, extremely fine grinding or using high energy dispersing equipment of various kinds. All of these methods have various drawbacks. Lakes are not useful in clear formulations or where a high concentration of pigment is required, such as in master batches. Lubricants, surfactants and the like can change the properties of the finished product. Even the best fine grinding equipment leaves much to be desired in the quality of the finished pigment. The initial cost and high operating expense of the high energy dispersing equipment makes this method expensive.

Another approach is to use the grinding method described in U.S. 3,201,051 wherein a pigment in the form of a mill powder is ground in the presence of a grinding agent which is removed by volatilization and without extraction with a liquid to obtain a dispersible pigment. The patented grinding process has drawbacks because grinding periods of from 18–72 hours are required and the pigment must first be converted to a dry powder before grinding thereby forming aggregates which must subsequently be broken up again.

It is therefore an object of this invention to provide an improved process for producing a pigment particle having improved dispersing and texture properties without forming pigment agglomerates or aggregates. Another object of this invention is an improved process for preparing pigments which substantially reduces processing time. A further object of this invention is a process for producing pigments which yields the product in a finely divided dry form without changing the particle size during processing. A still further object of this invention is a process for producing pigments using as a dispersing agent, a solid salt which can be removed by volatilization directly from the solid to the gaseous state at temperatures which do not cause thermal damage to the pigment, and an organic solvent. Other objects of the present invention will be apparent to one skilled in the art from the accompanying description and claims to follow.

In accordance with this invention a presscake of the pigment resulting either from a chemical synthesis or salt grinding is dehydrated by washing with a water soluble low boiling organic solvent having a boiling point below 100° C. and preferabily below 80° C. such as a low boiling alcohol, ketone, aldehyde or the like and mixtures thereof until all the water is removed from the pigment. The solvent pigment presscake is then intimately mixed with a solid salt dispersing agent which is solid and thermally stable at mixing temperatures but which can be vaporized or volatilized directly with the low boiling solvent from the admixture by gentle heating. A mixture of pigment presscake combined with the dispersing agent is mixed either by ball milling or agitating in the presence of inert agitating agents such as stones. There is obtained a mixture of very fine anhydrous pigment particles and if agitating agents are employed they are removed in the usual manner such as by screening. The resulting mixture is heated to just above the decomposition temperature of the dispersing agent which is in the range of about 50° C. to about 110° C. and below the temperatures at which pigmentary particles decompose whereby the solvent evaporates and the dispersing agent is decomposed leaving only the very fine, dry, pigmentary particles.

Best results are obtained when additional low boiling point solvent is admixed with the solvent pigment presscake and the dispersing agent. While the amounts of materials are not critical, a solvent pigment presscake containing 65–80% of the low boiling solvent with an addition of the solvent in the amount of 5–40 parts of solvent to one part of pigment calculated on a dry basis has been found to work well.

The following specific examples are intended for the purpose of illustrating the present invention. They should not be construed as limiting the invention to the precise ingredient, amounts or compounds specified.

EXAMPLE I

Fifteen grams, as calculated on a dry basis, of phthalocyanine blue crystallizing type toner water-wet, pigmentary presscake were slurried with 350 milliliters of a standard specially denatured alcohol known as Formula 2B SDA which is composed by mixing one-half gallon of benzene with 100 gallons 190 proof ethyl alcohol. The soluble materials were filtered from the slurry and the filtered and alcohol washed presscake admixed with 45 grams of ammonium carbonate and 500 milliliters of ethanol in a 1-quart porcelain ball mill jar half filled with French pebbles having an average diameter of ⅛–¼ inch. The ball mill is rotated for four hours at a peripheral speed of 136 feet per minute. The pebbles were screened from the admixture and the screened material filtered and dried at a temperature in the range of 65–70° C. whereby the ammonium carbonate and the solvent volatilized off. The finished pigment was obtained at a yield of 15 grams and, when dispersed in vinyl sheeting, a superior dispersion was obtained equalling or exceeding that obtained by the use of York Whiting lakes.

EXAMPLE II

Fifteen grams, as calculated on a dry basis, of phthalocyanine green presscake, which is chlorinated copper phthalocyanine blue, were treated in the same manner as described in Example I except that 150 grams of ammonium carbonate were used. A dry pigment having comparable properties to that in Example I was likewise obtained.

EXAMPLE III

The procedure and the amount of materials as outlined in Example I were employed except that a chlorobrominated copper phthalocyanine blue, which is commonly known as phthalocyanine green 6Y shade, was substituted for the indicated phthalocyanine blue and 150 grams of ammonium carbonate were employed. A finished pigment having comparable properties to that product of Example I was recovered.

EXAMPLE IV

Fifty-eight grams of a pigmentary water wet presscake obtained from the salt grinding of a chlorinated indanthrone, known as Ponsol Blue, and equivalent to 15 grams of the dry pigment were slurried in 300 milliliters of the Formula 2B SDA as described in Example 1. The resulting mixture was filtered and the alcoholic presscake washed with 50 milliliters of the 2B SDA alcohol. The washed presscake was admixed with 150 grams of ammonium carbonate and 350 milliliters of the 2B SDA alcohol in a 1-quart ball mill jar half filled with the French pebbles as described in Example I operated under the same conditions. The pebbles were likewise screened from the mixture and the screened mixture filtered and dried at 65–70° C. The resulting pigment, when compared with the same crude but finished by salt grinding, adding a dispersing agent and drying, showed superior rate of strength development in a varnish grind and superior dispersion in vinyl sheeting produced on a standard two roll mill.

EXAMPLE V

Fifteen grams, as calculated on a dry basis, of a pigmentary presscake produced by salt grinding N,N di-p-anisidine perylene-3,4,9,10-tetracarboxylic acid diimide, were slurried with the previously described 2B SDA alcohol, filtered and washed with a small quantity of the 2B SDA alcohol. The filtered and washed presscake was added to a 1-quart ball mill jar half filled with ⅛–¼ inch French pebbles. 150 grams of ammonium carbonate and 350 milliliters of the 2B SDA alcohol. The jar was rolled for four hours at a peripheral speed indicated in Example I. The slurry was screened from the stones, filtered and dried overnight at 65–70° C. The resulting fine powder when tested in an oil vehicle showed superior strength development over a commercial sample. In a vinyl sheeting formulation, the rate of strength development and ease of dispersion was superior to the commercial sample.

EXAMPLE VI

Eight hundred grams of Carbazole Violet pigmentary presscake, equivalent to 250 grams of the pigment toner, were slurried in 1500 milliliters of acetone. The slurry was filtered under vacuum until substantially dry and the resulting presscake transferred to a 1-quart porcelain ball mill jar to which is added 5200 grams of French pebbles, 1940 grams of ammonium carbonate and 4160 milliliters of acetone. The resulting mixture was mixed in the ball mill in the usual manner for four hours after which the pigment slurry was separated from the pebbles by screening and subsequently filtered. The filtered cake was dried at 60° C. to a constant weight. The resulting pigment product dispersed in plastic much more rapidly than the equivalent toner processed in the usual manner.

EXAMPLE VII

Forty-seven grams of C.I. Pigment Red 122 (quinacridone) pigmentary presscake, equivalent to 15 grams of the pigment toner were slurried in 250 milliliters of a commercially available alcohol solvent sold under the trade name Shellacol. The mixture was slurried to a smooth suspension, filtered by vacuum until substantially dry with the dried mixture containing 31.7% solvents. The dried mixture was added to a 1-quart porcelain ball mill jar and admixed with 350 milliliters of the 2B SDA alcohol solvent, as previously indicated in Example I, 100 grams of ammonium carbonate and 800 grams of the French pebbles also indicated in Example I and likewise processed in the same manner. After four hours, the pigment slurry was separated from the pebbles, filtered and dried at 60° C. to a constant weight. The resulting pigment product showed a greatly improved rate of pigment dispersion when compared to a commercially available dry toner of identical chemical composition.

In the foregoing examples ammonium carbonate is described as the volatilizable dispersing agent for the pigments. If desired, ammonium bicarbonate can be used as well as ammonium formate. The essential feature of the dispersing agent is that it be stable under mixing or agitating conditions yet be converted to volatilizable products on mild heating.

It is not essential that the low boiling organic solvent which is employed to dehydrate the presscake be the same as that which is added to the mixture of the solvent pigment presscake and the dispersing agent. Different low boiling hydrocarbon solvents can be employed in this respect as well as mixtures thereof. All that is required in addition to being a low boiling solvent is that the dispersing agent be insoluble therein.

The type of mixing device such as a ball mill, or the use of stones or steel balls placed in a suitable container with agitation is operable. The variable conditions relating to mixing are applicable in the present process. The amount of pigment dispersing agent, quantity and size of mixing devices can all be varied in accordance with conditions well recognized to those skilled in the art. The critical aspect in operating such a mixing device is that the temperature of the mixing medium be kept below the decomposition temperature of the dispersing agent or below the temperature at which the vapor pressure of the grinding medium becomes appreciable.

The process of this invention is applicable to a wide variety of pigments for example, the phthalocyanine pigments represented by either halogenated or unhalogenated, metal-free or metallic phthalocyanines, such as copper phthalocyanines, as well as vat dye pigments, such as indanthrone, halogenated indanthrones, flavanthrone yellow, dibenzanthrone green, dichloro iso-violanthrone, dibromo anthanthrone, pyranthrone, brominated pyranthrones (orange and scarlet), perylene reds, acridone and oxazole reds, thio indigo and halogenated thio indigo reds and maroons. Azo pigments and metal chelate azo pigments can also be employed. All that is required of the pigment is that it be insoluble in the water soluble low boiling organic solvent and inert to the dispersing agent.

Through the present invention pigments in the form of very small and finely divided particles can be processed without subsequent agglomerates or aggregates being formed. This is accomplished by employing a pigment in the form of a presscake wherein the pigment has not been previously dried and through the use of the volatilizable dispersing agent. The pigment is obtained in soft, dry and readily dispersible powder and the physical pigmentary properties are not altered from their form in the pigmentary presscake. Long mixing times are not required. A mixing time in the order of four hours and not in excess of five hours is all that is required.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

I claim:
1. A process for preparing dry pigments with fine particle size and dispersibility without agglomeration or aggregation comprising solvent dehydrating a pigmentary presscake with at least one low boiling, water soluble organic solvent, combining and thoroughly mixing said dehydrated pigmentary presscake with said organic solvent and a solid salt dispersing agent which is thermally stable under the conditions of said mixing and is volatilizable when heated to temperatures below that at which said pigments decompose, said dispersing agent being substantially insoluble in said solvent and thereafter heating the resulting mixture to a temperature sufficient to volatilize said solid salt dispersing agent.

2. The process as defined in claim 1 wherein said solid salt dispersing agent is selected from the group consisting of ammonium carbonate, ammonium bicarbonate and ammonium formate.

3. The process as defined in claim 1 wherein a mixture of low boiling organic solvents is employed.

4. The process as defined in claim 1 wherein an additional portion of said low boiling organic solvent is mixed with said substantially dehydrated presscake and said solid salt dispersing agent.

5. The process as defined in claim 1 wherein said temperature to volatilize said solid salt dispersing agent is in the range of about 50–110° C.

6. The process as defined in claim 1 wherein said process is completed in five hours.

7. The process as defined in claim 1 wherein said pigmentary presscake is a phthalocyanine.

8. The process as defined in claim 1 wherein said pigmentary presscake is a perylene.

9. The process as defined in claim 1 wherein said low boiling organic solvent is an alcohol.

10. The process as defined in claim 9 wherein said presscake is originally dehydrated with an alcohol so as to produce a presscake containing about 65–80% alcohol.

References Cited

UNITED STATES PATENTS

| 2,556,727 | 6/1951 | Lane et al. | 106—288 |
| 2,723,981 | 11/1955 | Tullsen | 106—288 |
| 3,296,008 | 1/1967 | Pugin | 106—288 |
| 3,341,345 | 9/1967 | Ehrich | 106—309 |

JAMES E. POER, *Primary Examiner.*